United States Patent
Bahk

(10) Patent No.: US 11,670,018 B2
(45) Date of Patent: Jun. 6, 2023

(54) METHOD FOR REPLAYING VECTOR IMAGE

(71) Applicant: BK LTD., Gyeongsangbuk-do (KR)

(72) Inventor: Jae Hyun Bahk, Gyeongsangbuk-do (KR)

(73) Assignee: BK LTD., Gumi-si (KR)

(*) Notice: Subject to any disclaimer, the term of this patent is extended or adjusted under 35 U.S.C. 154(b) by 0 days.

(21) Appl. No.: 17/690,971

(22) Filed: Mar. 9, 2022

(65) Prior Publication Data
US 2022/0292745 A1    Sep. 15, 2022

(30) Foreign Application Priority Data
Mar. 9, 2021 (KR) .......................... 10-2021-0030635

(51) Int. Cl.
| | |
|---|---|
| G06T 11/20 | (2006.01) |
| G06T 11/40 | (2006.01) |
| G06F 3/04845 | (2022.01) |
| G06F 3/04847 | (2022.01) |
| G06F 3/04842 | (2022.01) |

(52) U.S. Cl.
CPC ........ *G06T 11/203* (2013.01); *G06F 3/04842* (2013.01); *G06F 3/04845* (2013.01); *G06F 3/04847* (2013.01); *G06T 11/40* (2013.01); *G06T 2200/24* (2013.01)

(58) Field of Classification Search
CPC ... G06T 11/203; G06T 11/40; G06T 2200/24; G06T 9/00; G06T 9/20; G06F 3/04842; G06F 3/04845; G06F 3/04847
See application file for complete search history.

(56) References Cited
U.S. PATENT DOCUMENTS

| | | | | |
|---|---|---|---|---|
| 5,790,441 A | * | 8/1998 | Oami ...................... | G06T 9/007 708/402 |
| 11,200,708 B1 | * | 12/2021 | Badhani ................ | G06T 11/001 |
| 11,275,500 B1 | * | 3/2022 | Danila .................. | G06F 3/0416 |
| 2007/0279494 A1 | * | 12/2007 | Aman .................... | H04N 5/278 348/169 |
| 2010/0171750 A1 | * | 7/2010 | Eberhard ................ | G06T 11/60 345/589 |
| 2012/0028706 A1 | * | 2/2012 | Raitt ...................... | A63F 13/12 463/31 |
| 2013/0335333 A1 | * | 12/2013 | Kukulski ............ | G06F 3/04847 715/702 |

(Continued)

*Primary Examiner* — Patrick F Riegler
(74) *Attorney, Agent, or Firm* — NKL Law; Jae Youn Kim

(57) ABSTRACT

A method for replaying a vector image. The method includes: (a) extracting replay information and work environment information of each of the vector lines from an original vector image; (b) receiving a selection of regions of specific vector lines from a user; (c) changing and updating replay settings of the vector lines selected in step (b); (d) replaying the vector image selected by the user; and (e) storing the updated information of the vector image or ending the method for replaying the vector image. Therefore, it is possible to sequentially store every step of drawing work and even a work environment, in addition to vector line information, and replay the stored vector image, as if a scene in which an actual artist was drawing a picture were recorded, while breaking away from the conventional batch replay method of a vector image.

13 Claims, 18 Drawing Sheets

(56) References Cited

U.S. PATENT DOCUMENTS

| | | | |
|---|---|---|---|
| 2014/0313216 A1* | 10/2014 | Steingrimsson | G06V 30/32 |
| | | | 345/589 |
| 2016/0226933 A1* | 8/2016 | Beaufils | H04L 67/06 |
| 2016/0253090 A1* | 9/2016 | Angelov | G06V 30/347 |
| | | | 715/863 |
| 2017/0285930 A1* | 10/2017 | Sykes | H04N 21/4325 |
| 2017/0358114 A1* | 12/2017 | Tennant | G06T 13/80 |
| 2018/0260984 A1* | 9/2018 | Severenuk | G06V 30/32 |
| 2018/0349020 A1* | 12/2018 | Jon | G06F 3/04883 |
| 2020/0050876 A1* | 2/2020 | Hara | G06F 16/986 |
| 2022/0044431 A1* | 2/2022 | Nakamura | G06T 7/90 |
| 2022/0245874 A1* | 8/2022 | Bahk | G06T 11/40 |

* cited by examiner

The image of the entire layer eye layer
first priority
layer nose layer
second
priority layer mouth layer
third priority
layer face layer
fourth
priority layer method of replaying
unselected lines
o  not replyed
●  replaying unselected
   lines after replaying
   selected lines
o  replaying unselected
   lines first and then
   replaying selected lines selecting only face range with polygon

FIG. 18B

| Let's meet at six o'clock | Let's meet at six o'clock |
| first step / second step / third step / fourth step / fifth step | ⬇ Let's meet at o'clock ⬇ Let's meet at six o'clock ⬇ Let's meet at o'clock ⬇ Let's meet at six o'clock
repeating three times |

FIG. 19

Let's meet at (Six) o'clock   repetition count
first step                    [twice]

Let's meet at (Six) o'clock   repetition content
second step                   ● Reappear
                              ○ color change / color setting
                              ○ line information change Let's meet at (Six) o'clock   repetition method
third step                    ● repeating after replaying
                                entire content
                              ○ repeating in replay sequence Let's meet at (Six) o'clock
fourth step

METHOD FOR REPLAYING VECTOR IMAGE

CROSS REFERENCE TO RELATED APPLICATION

The present application claims priority to Korean Patent Application No. 10-2021-0030635, filed Mar. 9, 2021, the entire contents of which is incorporated herein for all purposes by this reference.

FIELD OF THE INVENTION

The present disclosure relates to a method for replaying a vector image and, more particularly, to a method for replaying an image drawn in a vector method by using a mobile device, a tablet PC, or a computer terminal.

BACKGROUND OF THE INVENTION

Computer graphics is largely divided into a bitmap method and a vector method.

FIGS. 1 and 2 are views respectively illustrating processes of drawing a picture or text in a mobile device.

In FIG. 1, a process of drawing the picture in the bitmap method is illustrated, and in FIG. 2, a process of drawing the picture in the vector method is illustrated.

In the related art, when drawing a picture or text on a screen by using the mobile device, the bitmap method is used as shown in FIG. 1.

Since the bitmap method includes only color information per pixel, only a color may be changed for each pixel when a user desires to perform correction or modification later.

Accordingly, a vector graphics method has been developed, wherein a picture and text that are drawn include, for each pixel, line information rather than color information so that the drawn picture and text may be modifiable.

The vector graphics refers to a method in which objects such as points, straight lines, curves, and polygons, which are based on mathematical equations are used when displaying a picture in computer science.

The vector graphics technology is a method in which an electron beam continuously moves along a line segment or curve appearing on a graphic screen to display an image on the screen, and there is an advantage of conveniently processing line drawings and having high resolution.

That is, vector graphics create a digital image through a series of commands or mathematical expressions in order to arrange lines or shapes in a given two-dimensional or three-dimensional space.

A vector in physics refers to an entity having both a magnitude and a direction at the same time.

Meanwhile, in vector graphics, graphic files that are the results of creative activities of artists are created and stored in the format of a series of vector declarative sentences. For example, a vector graphics file includes positions of a series of points to be connected to each other in order to draw a line, instead of storing a plurality of bits. Accordingly, the vector graphics file results in a smaller file size than that of the related art.

That is, as shown in FIG. 2, the vector method includes information (hereinafter abbreviated as "vector line information") such as work sequence indices of vector lines, coordinate values stored in each line, a thickness of each line, a color of each line, a shape of each line, types of pens used to draw an image, types of brushes used, transparency of each line, and pen pressure indicating the pressure with which a pen is pressed.

Accordingly, an image in the conventional bitmap method is provided with only a final result. Whereas in the vector method, each stroke sequentially stored for each work step is recalled, so that each stroke may be able to be redrawn or modified.

Meanwhile, since the conventional vector image method only stores information about lines, it is impossible to know a work environment information at the time of drawing a picture and text, or an actual method by which a user draws the picture and text. Accordingly, the conventional vector image method is different from a method where an actual work process is recorded as a moving picture. Because of this, there was an inconvenience that the picture and text is unable to be replayed in a work environment the same as an actual work environment that is generated in an actual work process such as how a user drew the picture and text by setting an actual screen size and aspect ratios, and how colors were chosen.

In addition, in the conventional vector image, since the picture and text are stored only in a work sequence, the user is unable to appreciate a specific part by replaying only the specific part separately or replaying only a specific color.

For example, even in a case where the user desires to focus on only a part in which the eyes are drawn within a picture drawn by another user, the conventional vector image method should only replay the entire picture, whereby there was considerable inconvenience.

In addition, when a user draws text in vector and sending the text to his or her friend, there are various possible communication methods to be used, but the conventional vector image replay method replays the entire work process at once, so there is a problem that it is difficult to use the conventional method for emotional communication between users.

Meanwhile, although the conventional bitmap method provides a method that allows communication by means of an image, it was impossible to perform a drawing work by adding or changing content, changing colors, changing replay sequences, or the like.

The present inventor has disclosed technology in the following Korean Patent No. 10-1857581 (published on May 14, 2018) that is applied for a patent and has been registered for the patent, wherein the technology is related to a turn-based picture chatting method in which a large number of chatting participants draw pictures in a turn-based manner and communicate each other's intentions to the other party so as to increase efficiency of sharing ideas or communication.

Therefore, there is a demand for development of technology that enables to solve the problems that occur in the conventional bitmap method and vector image replay method as described above, enables appreciation of a picture more easily and learning of the picture easily, and allows users to communicate their emotions in a more fun way through pictures.

SUMMARY OF THE INVENTION

As described above, in the conventional bitmap image technology, since there is no technology for replaying work processes of pictures, videos are mainly recorded and provided to other users.

Nonetheless, in the past, HD-grade video was sufficient for use, but since most mobile devices and various displays recently support 4K-grade videos, there are many other inconveniences in the method for recording and providing videos, and in particular, 4K-grade videos require a significant amount of data.

Accordingly, rather than dealing with excessive buffering or charge problems caused by the significantly excessive amount of data, when a user replays vector images having a stored work sequence, the user may be able to produce the video with 4K quality and less than 10 megabytes of data, and thus in Patent Document 1, the method for replaying an image in vector has been proposed.

However, in the conventional vector image replay technology, there are various inconveniences, as the technology simply shows a work process line by line.

That is, in an actual drawing work process, there are indeed various actual work processes, such as selecting colors, drawing layer by layer, or managing various setting windows, but in the conventional vector image replay technology, only the work process regarding lines, which are the results of the work process, could be viewed.

Further, a technique is required that replays a vector image in various ways such that a specific region or a specific color part desired by a user is separately appreciated, or only a specific part is repeatedly appreciated, or specific phrases or text is used to emphasize or used to express emotions in communication by means of drawing text.

An objective of the present disclosure is to solve the problems described above and provide a method for replaying a vector image, wherein a work process of the image is stored and the stored work process is replayed in the same way as an actual work environment, in addition that a viewing screen is enlarged or reduced.

Another objective of the present disclosure is to provide a method for replaying a vector image, the method being able to change and replay a sequence of drawing work stored consecutively in a vector method as desired by a user.

In order to achieve the above objectives, a method for replaying a vector image according to the present disclosure is provided for replaying the image in a vector method configured to store information on consecutive work sequences and vector lines that are stored for each work step of each of the vector lines that performed work of drawing the image including pictures and text, and includes: (a) extracting replay information and work environment information of each of the vector lines from an original vector image; (b) receiving a selection of regions of specific vector lines from a user; (c) changing and updating replay settings of the vector lines selected in step (b); (d) replaying the vector image selected by the user; and (e) storing the updated information of the vector image or ending the method for relaying the vector image.

As described above, according to the method for replaying a vector image according to the present disclosure, there is provided an effect that it is possible to sequentially store every step of drawing work and even a work environment, in addition to vector line information, and replay the stored vector image, as if a scene in which an actual artist was drawing a picture were recorded, while breaking away from the conventional batch replay method of a vector image.

Therefore, according to the present disclosure, there is provided an effect that a user may be able to see a size and aspect ratio of a screen and usage status of setting windows at the time of drawing work, and appreciate only a specific part the user himself or herself desires in a way of drawing a selection line by color, polygon, or stroke in the specific part and then partially selecting the specific part, so as to replay only the partially selected part once or repeatedly from the entire vector image.

As described above, according to the present disclosure, there is provided an effect of providing a lot of convenience for learning to draw a picture or partially appreciating the picture, and also there is provided another effect that text is sent, repeated, or emphasized by changing a replay sequence thereof even when communicating with the other party by means of drawing the text to transmit or retransmit the text to the other party, thereby further increasing a user's interest by making emotional communication more fun.

BRIEF DESCRIPTION OF THE DRAWINGS

FIGS. 18A, 18B, and FIG. 19 are views respectively illustrating processes of selecting, highlighting, and replaying a specific region in an image drawn in the vector method.

DETAILED DESCRIPTION OF THE DRAWINGS

Figure 1:
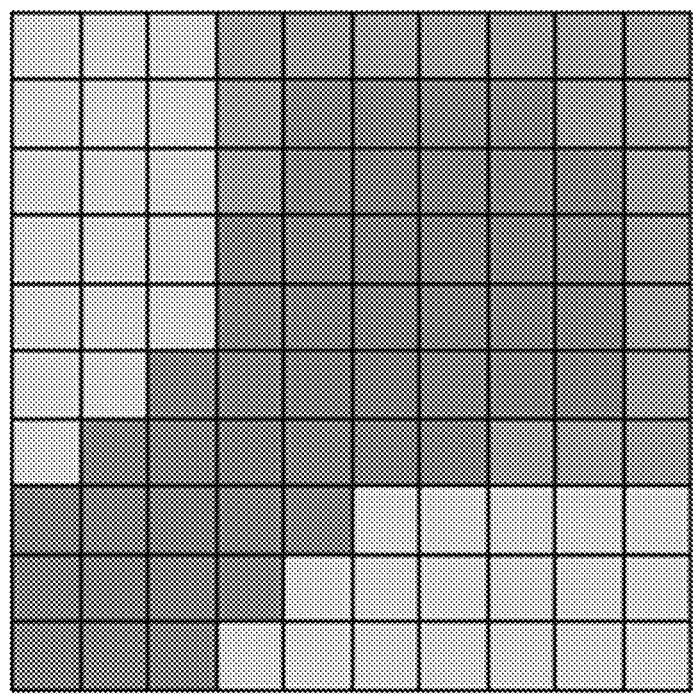
FIG. 1 and FIG. 2 are views respectively illustrating processes of drawing a picture or text on a mobile device.
Figure 2:
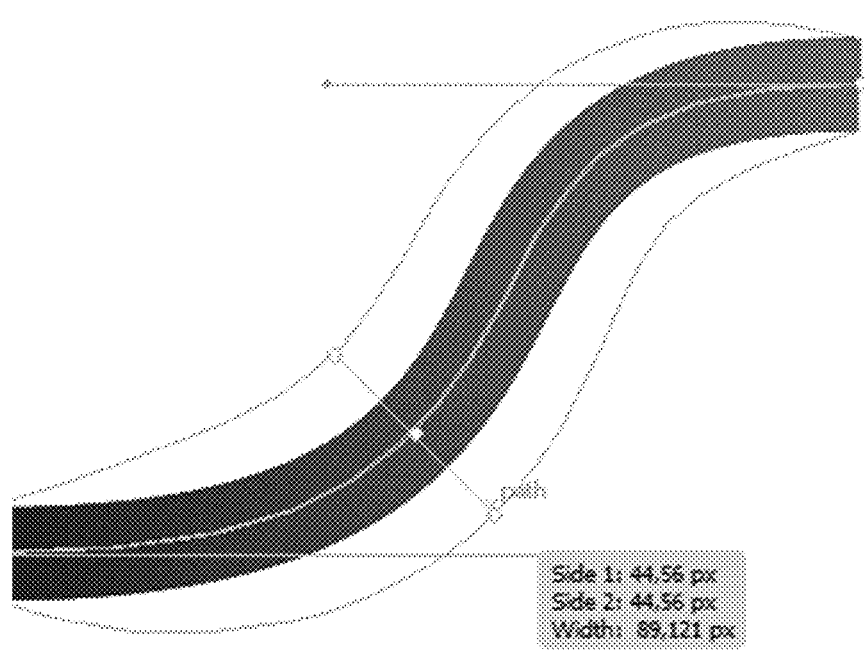

Hereinafter, a method for replaying a vector image using redo and undo functions according to a preferred exemplary embodiment of the present disclosure will be described in detail with reference to the accompanying drawings.

The embodiment of the present disclosure replays an image drawn in a vector method by using a mobile device, a tablet PC, or a computer terminal (hereinafter abbreviated as "mobile device"), that is, the embodiment replays an image stored in the mobile device.

In addition, the embodiment of the present disclosure provides various setting windows used by an actual user to work in each work step of a vector image stored in a mobile device, and stores, in vector information, work environment information according to an actual work process together, thereby replaying the vector image on an actual work screen by the vector information as if the actual work screen were recorded.

In addition, according to the present disclosure, in each operation step of an image stored in the vector method, a work sequence of the image is changed and replayed as desired by a user, or only a desired part of the image is selected and replayed by the user.

The method for replaying the vector image according to the preferred exemplary embodiment of the present disclosure may be performed in mobile devices, tablet PCs, computer terminals, and the like, which have been activated by downloaded programs or applications so as to control operations of the mobile devices, tablet PCs, computer terminals, and the like, or perform the method for replaying the vector image.

For example, although not shown in the drawings, the mobile device may include: a display part configured to display an image such as a picture or text on a screen; an input part configured to receive input of a user's operation command; a program or application configured to drive the mobile device; a storage part configured to store information of the image drawn in the vector method and input information input by a user; and a controller configured to control driving of each device.

Here, the display part and the input part may be integrated into a touch screen to increase user's operation convenience.

The controller may execute the program or application to store the information of the image drawn in the vector method, change a color or size according to a user's operation, and control to replay the image by changing a replay sequence.

That is, the controller stores information on consecutive work sequences and vector lines, which are stored for each work step of each vector line in which the work of drawing an image including pictures and text is performed, and may control to replay the stored image in the vector method.

Accordingly, the method for replaying a vector image according to the present disclosure includes: (a) extracting replay information and work environment information of each vector line from an original vector image; (b) receiving a selection of regions of specific vector lines from a user; (c) changing and updating replay settings of the vector lines selected in step (b); (d) replaying the vector image selected by the user; and (e) storing the updated information of the vector image or ending the method for replaying the vector image.

Figure 3:
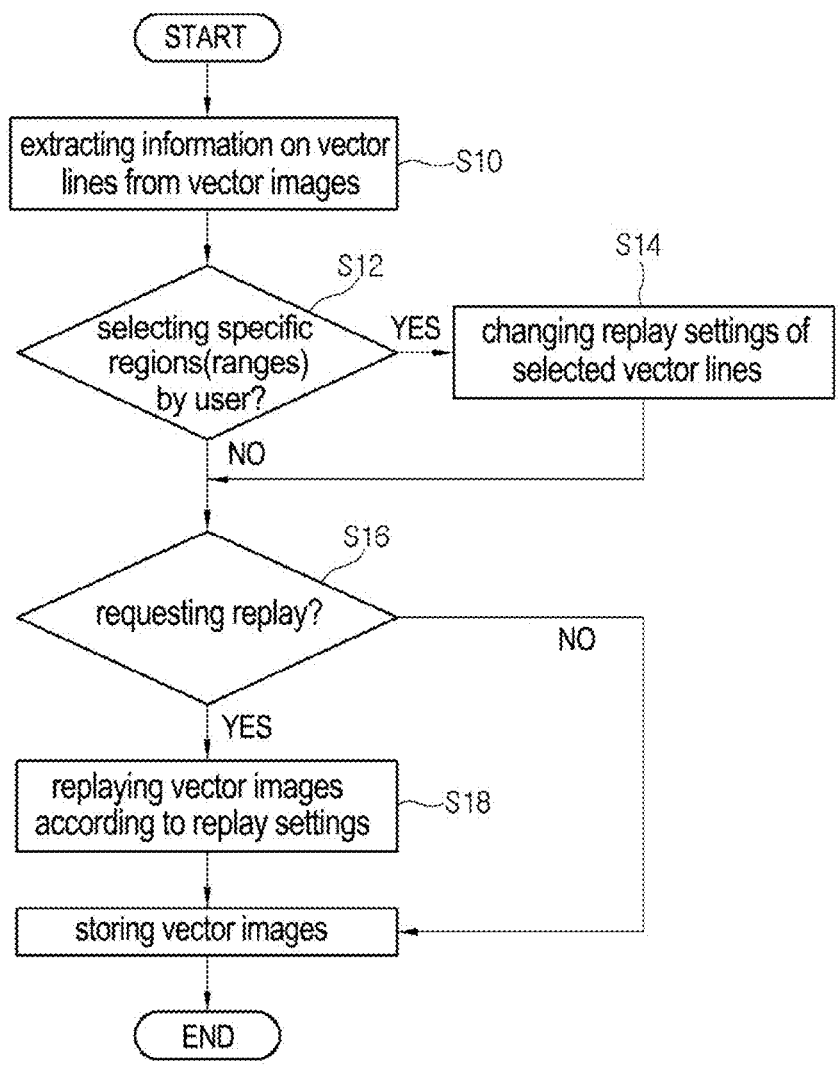
FIG. 3 is a flowchart illustrating step-by-step a method for replaying a vector image according to a preferred exemplary embodiment of the present disclosure.

To describe in detail, FIG. 3 is a flowchart illustrating step-by-step the method for replaying the vector image according to the preferred exemplary embodiment of the present disclosure.

In step S10 of FIG. 3, the controller calls and loads a vector image stored in a memory, and extracts information of vector lines from the vector image.

In step S12, the controller checks whether a specific region is selected by a user through an input part.

When the specific region is selected as a result of checking in step S12, replay settings of the selected vector lines are changed in step S14. In this case, each replay setting may include one or more of a replay sequence, a replay method, a section repetition, a highlight pointer, and the like.

When the specific region is not selected as the result of the checking in step S12, or after performing step S14, the controller checks whether a replay request is input through the input part in step S16.

When the replay request is input as a result of the inspection in step S16, the controller controls to replay the vector image according to the replay settings in step S18.

Whereas, when the replay request is not input as the result of the checking in step S16, or after replaying the vector image in step S18, the controller stores the vector image in the memory and ends the method for replaying the vector image.

The replay information of the vector lines extracted in step S10 may include a replay sequence, a start point of a vector line to start replay, an end point to end repeated replay, the number of repetitions, and highlight pointer information, which are present within each of the vector lines.

The highlight pointer information may include any one or more of a color, a thickness, and a line type of each vector line present in a repetition section when repeating replay, and a redrawing-after-erasing function.

In the method of receiving the selection of the regions of the specific vector lines from the user in step S12, the vector lines may be selected by setting one or more specific colors or specific color ranges.

In the method of receiving the selection of the regions of the specific vector lines from the user in step S12, the vector lines may be selected by drawing one or more of polygonal, circular, or elliptical shapes.

When the vector lines are not selected by the user in step S12, fundamentally all vector lines may be selected.

In the method of receiving the selection of the regions of the specific vector lines from the user in step S12, a stroke unit selection line may be drawn and vector lines touching the stroke unit selection line may also be selected.

In step S14, the respective replay sequence of the vector lines selected by the user may be set differently.

In the method for replaying the vector image in step S18, only selected vector lines may be replayed.

In the method for replaying the vector image in step S18, only the selected vector lines may be replayed, and then unselected vector lines may be replayed, or the unselected vector lines may be replayed first, and then the selected vector lines may be replayed.

The work environment information of the vector lines may include information on positions and sizes of various setting windows used in each work step, information on screen enlargement sizes and screen positions, and information on positions and sequences of work layers.

The method for replaying the vector image in step S18 may replay information the same as that of actual work for each work step according to the work environment information, including: the information on the positions and the sizes of various setting windows used in each work step; the information on the screen enlargement sizes and the screen positions; and the information on the positions and the sequences of the work layers.

Hereinafter, an exemplary view illustrating the method for replaying the vector image according to the preferred exemplary embodiment of the present disclosure will be described in detail by contrasting the related art.

Figure 4A:
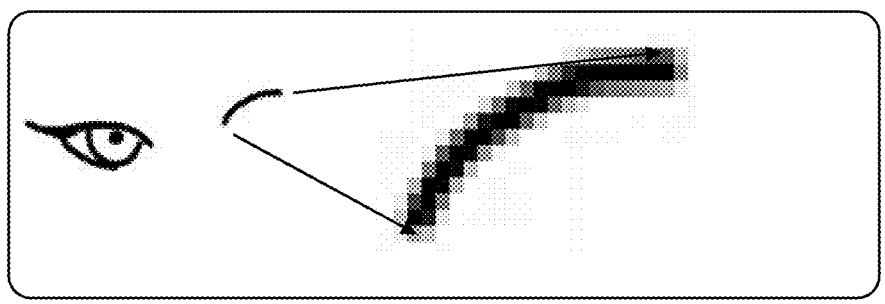
FIGS. 4A and 4B are views respectively illustrating a work process of drawing a picture in a bitmap method and a work process of drawing a picture in a vector method according to the related art.
Figure 4B:
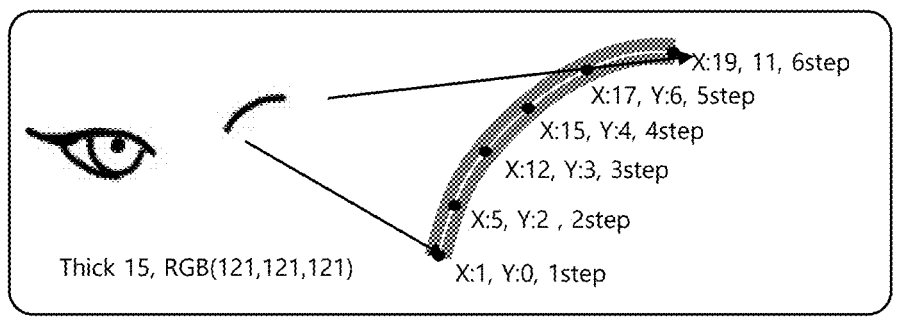

For example, FIGS. 4A and 4B are views respectively illustrating a work process of drawing a picture in a bitmap method and a work process of drawing a picture in a vector method according to the related art.

The bitmap method stores only color information per pixel as shown in FIG. 4A. As such, in the bitmap method, when a size of a drawn picture is enlarged, the picture is distorted.

Whereas, the vector method stores various pieces of pen information such as line lengths, thicknesses, colors, coordinate values, work sequences, pen types, patterns, and pen pressure, as shown in FIG. 4B. Accordingly, since the vector method is a method for redrawing a picture by using the information stored in each line even when the picture is enlarged, the vector method may provide a good quality picture.

Figure 5:
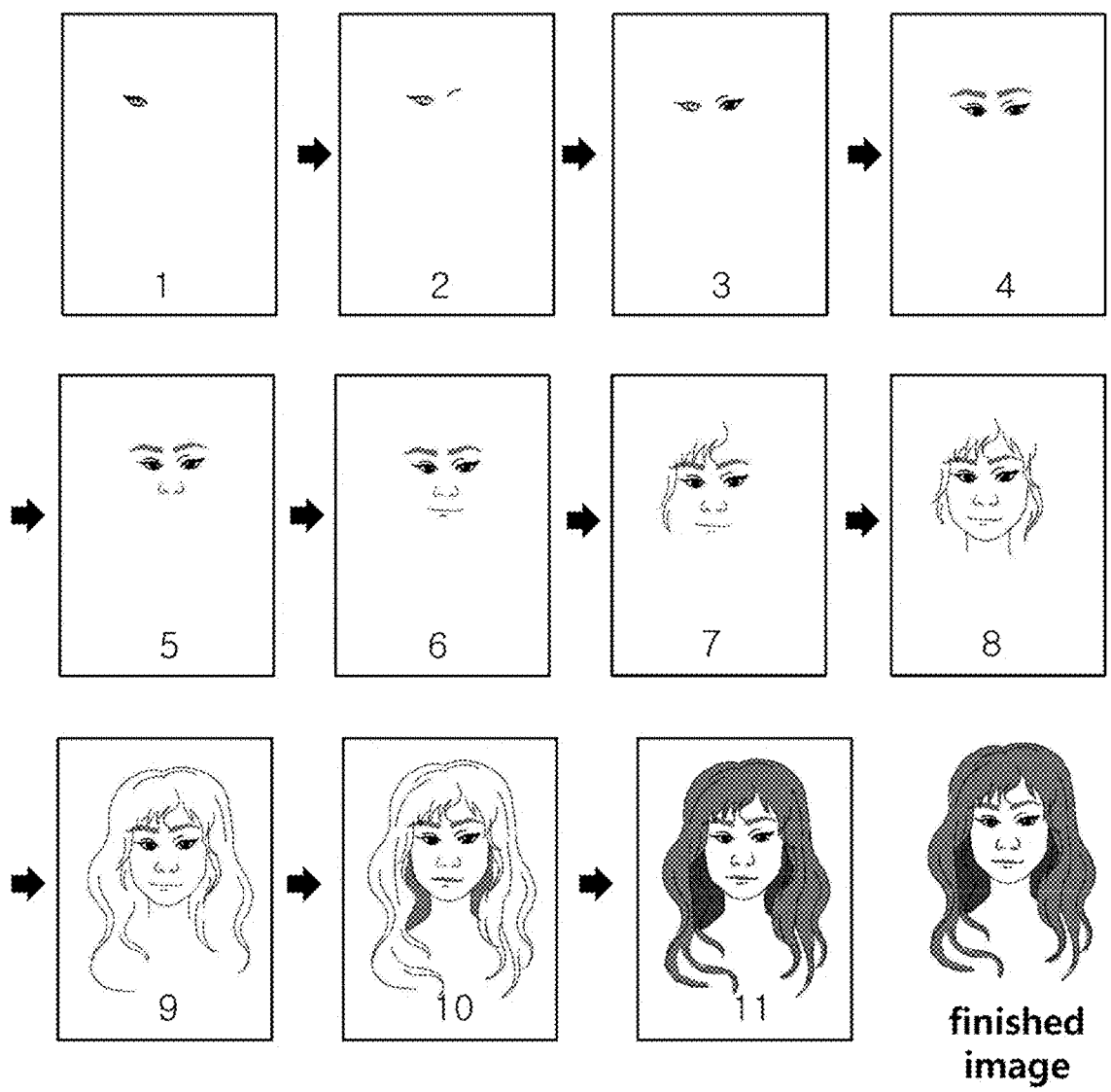
FIG. 5 and FIG. 6 are views respectively illustrating processes of replaying a picture drawn in the vector method according to the related art.
Figure 6:
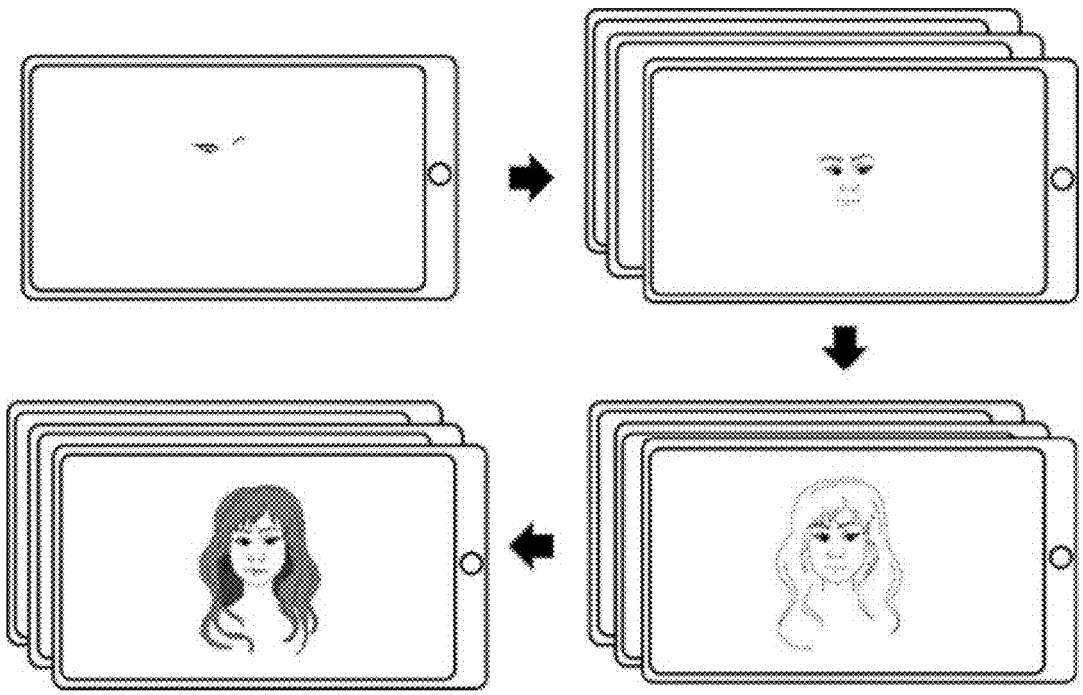

FIGS. 5 and 6 are views respectively illustrating processes of replaying pictures drawn in the vector method according to the related art.

As shown in FIG. 5, the vector method according to the related art may replay work content in which each of parts is drawn in detail, similar to a development figure of a picture, not as an actual work process.

In addition, as shown in FIG. 6, the vector method according to the related art may only simply replay the replay process at the time of replaying a picture at a full aspect ratio.

Whereas, in the method for replaying the vector image according to the present disclosure, information on aspect ratios, sizes, and various setting windows at a time when an actual artist is working may be replayed and appreciated in the same way as at the time of the actual work. Therefore, the actual method for replaying the vector image according to the present disclosure shows a replay screen as if the work process were recorded as a video, so that a user may appreciate the video that appears to be a recording of the work process.

Figure 7:
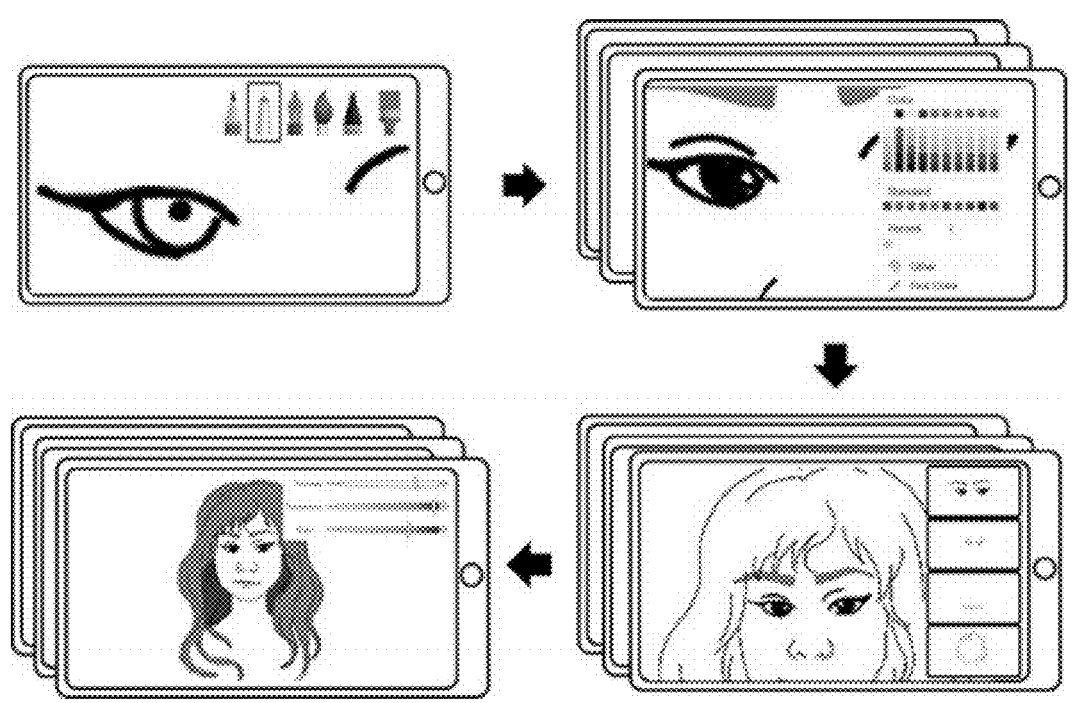
FIG. 7 is a view illustrating the method for replaying the vector image according to the preferred exemplary embodiment of the present disclosure.
Figure 8:
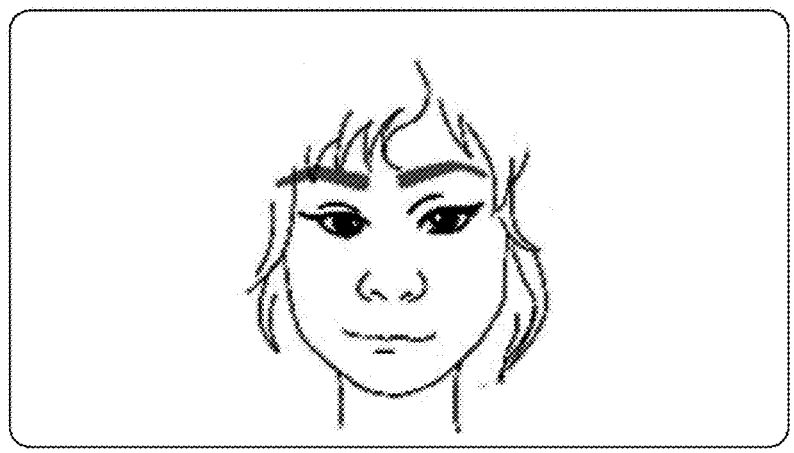
FIG. 8 is a view illustrating a process of replaying the vector image together with a pen selection window, a layer window, and a color window, which are included in a vector image.
Figure 8:
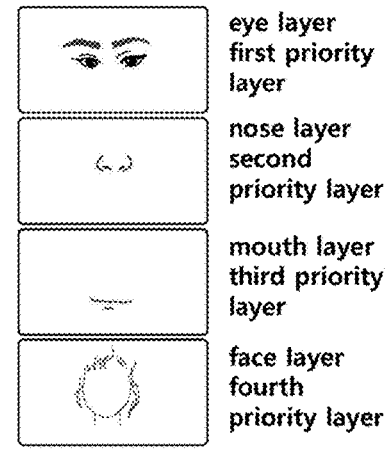

For example, FIG. 7 is a view illustrating the method for replaying the vector image according to the preferred exemplary embodiment of the present disclosure, and FIG. 8 is a view illustrating a process of replaying the vector image together with a pen selection window, a layer window, and a color window, which are included in a vector image.

In the method for replaying the vector image according to the preferred exemplary embodiment of the present disclosure, as shown in FIG. 7, scenes for selecting lines at the time of work, scenes for working on layers, and scenes in which information on line brightness adjustment and aspect ratios is actually replayed may be replayed.

As most users who draw pictures with layer work, that is, artists, prefer to draw objects to be drawn by dividing the objects into parts, drawing with the layer work is a common technique as shown in FIG. 7.

However, the vector image replay technique according to the related art is unable to show such a process of layer work, but the embodiment of the present disclosure is capable of showing the layer work the same as the actual work.

Figure 9A:
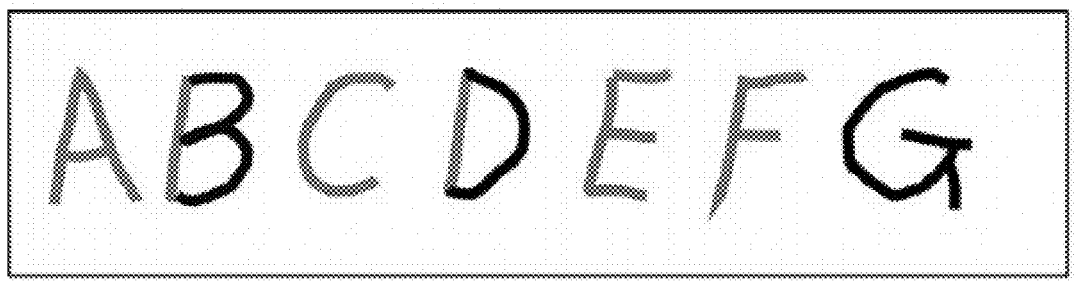
FIGS. 9A, 9B, and FIG. 10 are views respectively illustrating processes of receiving a specific color selected from a user, replaying strokes of the selected color first, and then sequentially replaying the remaining strokes.
Figure 9B:
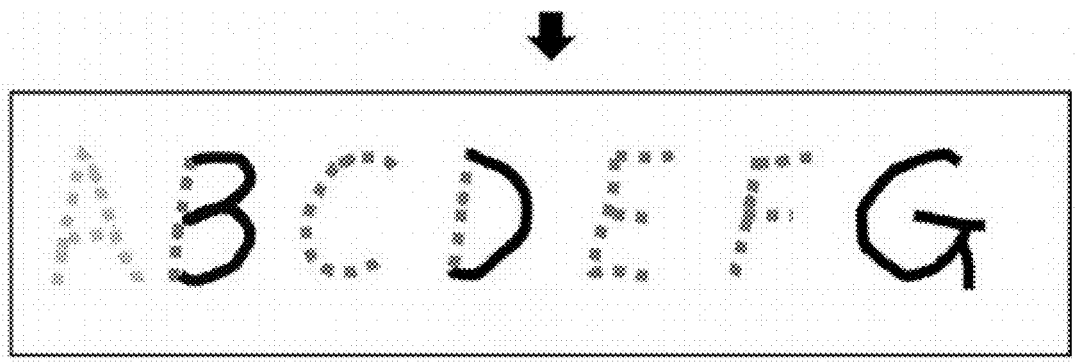
Figure 10:

FIGS. 9A, 9B, and 10 are views respectively illustrating processes of receiving a specific color selected from a user, replaying strokes of the selected color first, and then sequentially replaying the remaining strokes.

FIGS. 9A and 9B are views illustrating an example of selecting the specific color from a vector image to replay only the selected color, wherein FIG. 9A is an example of selecting only a color RGB(0, 0, 0) and FIG. 9B is an example of replaying only text of the selected color.

FIG. 9A is a view illustrating a state of selecting only a color RGB(0, 0, 0) in letters "ABCDEFG" drawn in the vector method with RGB(0,0,0) as black and RGB(127, 127, 127) as gray, and FIG. 9B is a view illustrating a process of replaying only the text of the selected color.

FIG. 10 is a view illustrating a process in which only the color RGB (0, 0, 0) selected in FIG. 9A is selected so as to first replay text region of the selected color, and then the text region of the remaining colors are sequentially replayed according to the original work sequence.

Figure 11A:
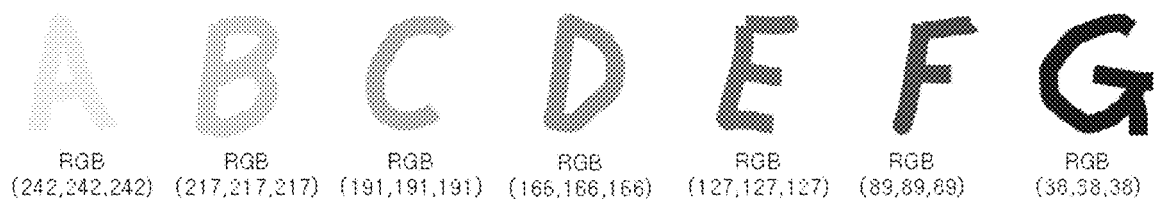
FIGS. 11A to 11C are views illustrating a process of setting and replaying the vector image provided with a plurality of color ranges instead of one color.
Figure 11B:
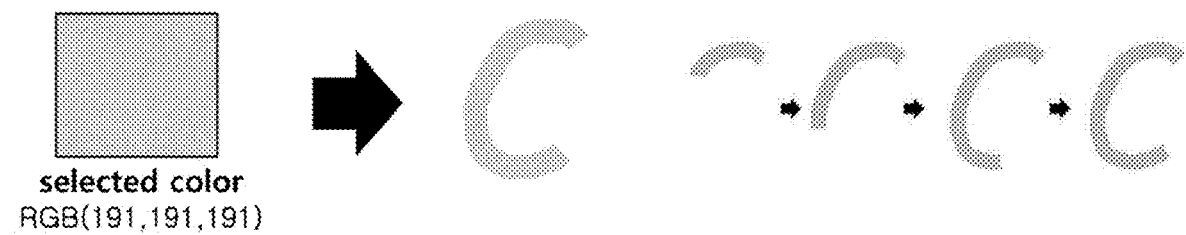
Figure 11C:
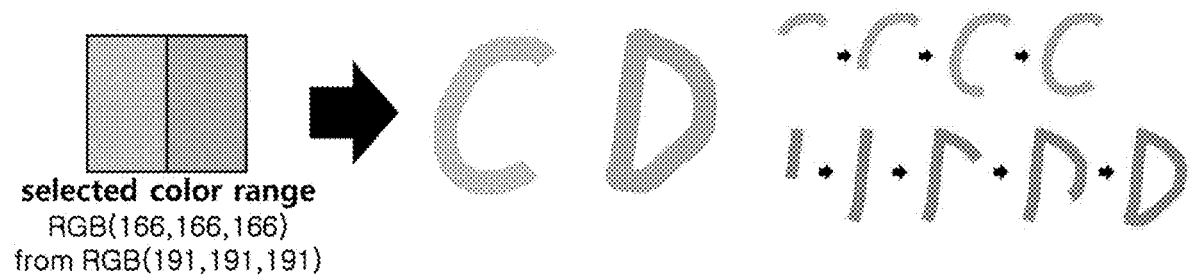
Figure 12:
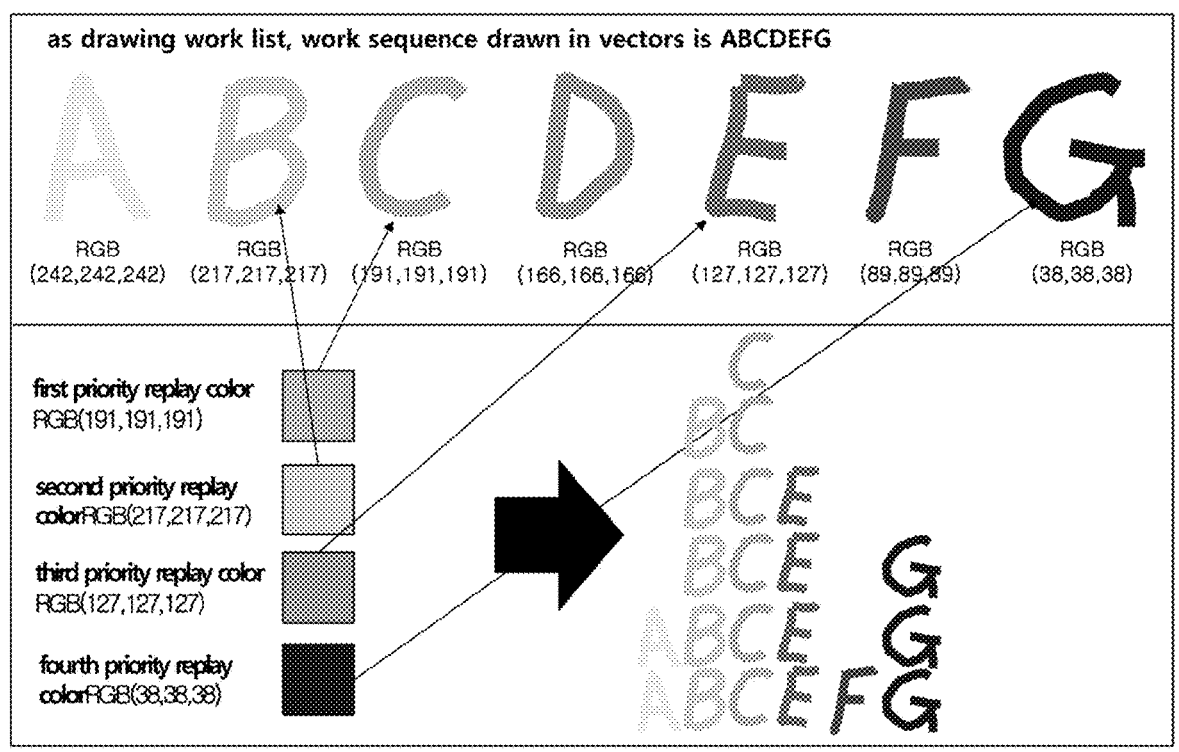
FIG. 12 is a view illustrating a process of setting a replay sequence for each color shown in FIGS. 11A to 11C and sequentially replaying the remaining strokes according to an original work sequence.

FIGS. 11A to 11C are views illustrating a process of setting and replaying the vector image provided with a plurality of color ranges instead of one color, and FIG. 12 is a view illustrating a process of setting a replay sequence for each color shown in FIGS. 11A to 11C and sequentially replaying the remaining strokes according to the original work sequence.

FIG. 11A is a view illustrating the letters "ABCDEFG" drawn in various colors according to the conventional vector image technology. FIG. 11B is a view illustrating a process of selecting and replaying a letter provided with one color, that is, a color RGB (191, 191, 191). FIG. 11C is a view illustrating a process of selecting several color ranges and replaying the letters of the selected vectors as in the original replay sequence.

As described above, according to the present disclosure, the letters "ABCDEFG" drawn by the vector image technique may be selected for each color, and the replay sequence may be changed, set, and replayed.

Figure 13A:
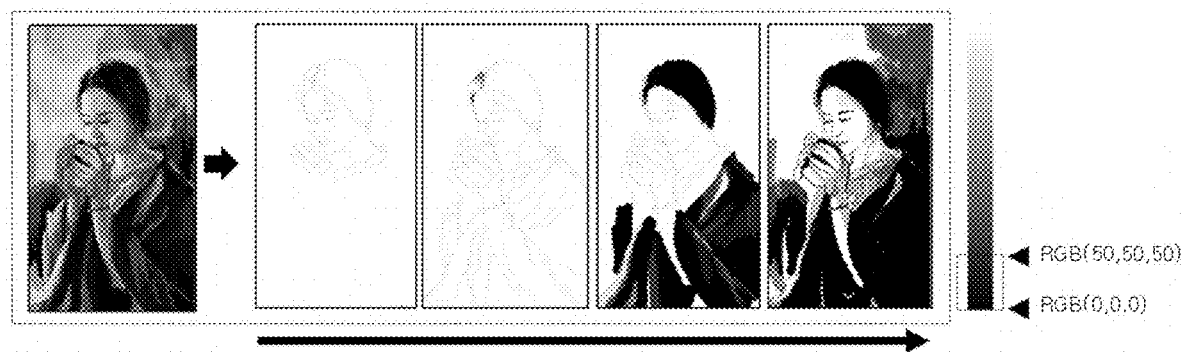
FIGS. 13A and 13B are views illustrating a process of selecting specific color ranges and replaying an image provided with the specific color ranges in the image drawn in the vector method.
Figure 13B:
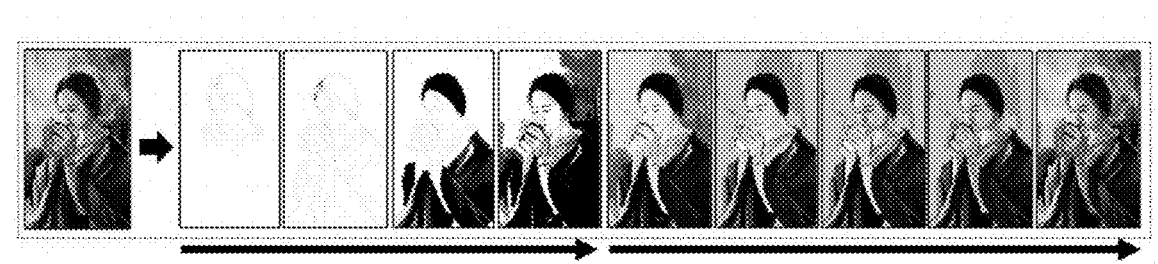

FIGS. 13A and 13B are views illustrating a process of selecting specific color ranges and replaying an image provided with the specific color ranges in the image drawn in the vector method.

In FIG. 13A, a process of selecting and first replaying a vector image provided with color ranges from a black color RGB(0,0,0) to a color RGB(50,50,50), and ending the process without replaying the remaining strokes is illustrated.

In FIG. 13B, a process of replaying the image provided with the color ranges from the black color RGB(0,0,0) to the color RGB(50,50,50) illustrated in FIG. 13A as a first step in an actual vector picture, and then replaying as well the image provided with all the remaining colors in a second step according to the original work sequence.

Figure 14:
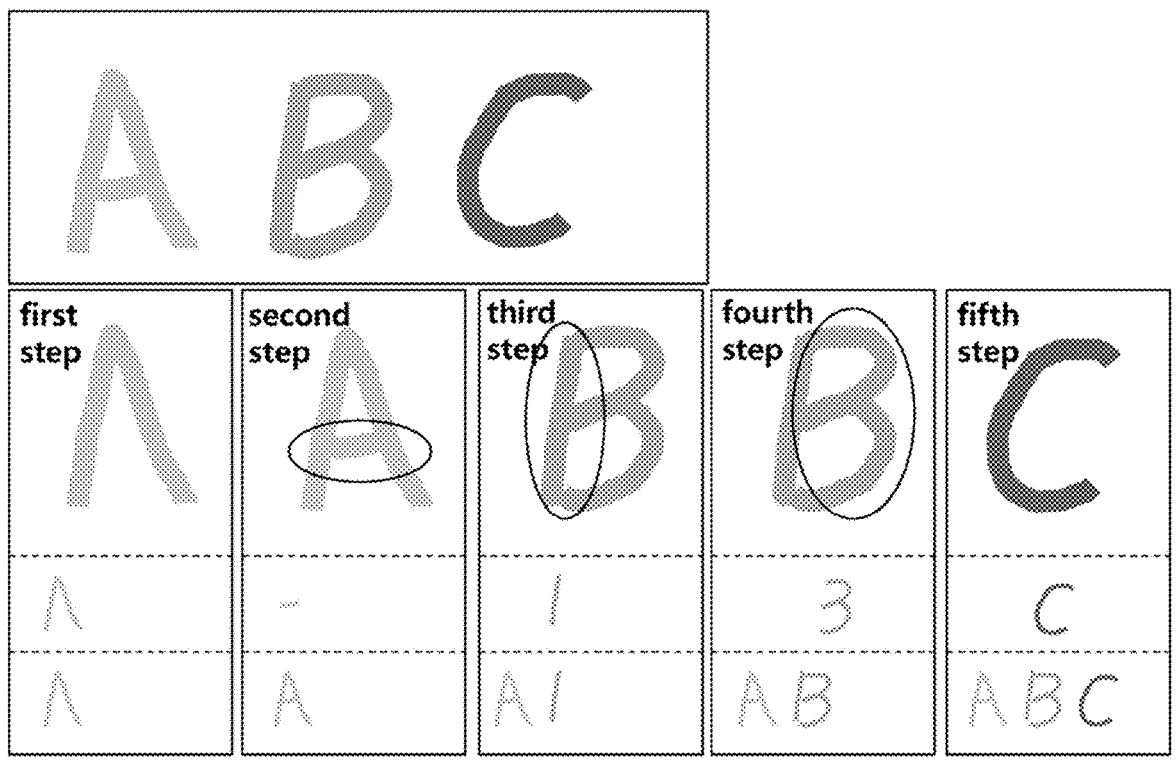
FIG. 14 is a view illustrating an image in which letters A, B, and C are drawn with vector lines.
Figure 15:
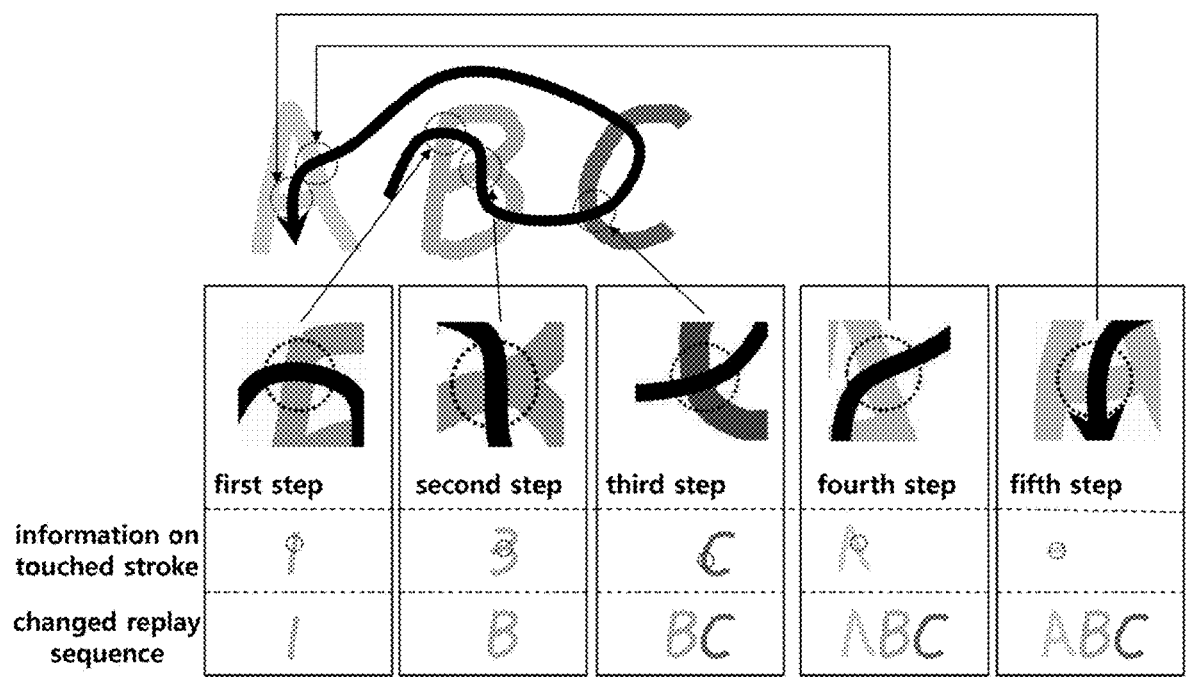
FIG. 15 is a view illustrating a process of selecting a work sequence by using a stroke unit selection line.

FIG. 14 is a view illustrating an image in which letters ABC are drawn by vector lines, and FIG. 15 is a view illustrating a process of selecting a work sequence by using a stroke unit selection line.

FIG. 14 is a view illustrating a process of drawing the letters ABC by vector lines when a user writes text other than a picture, and FIG. 15 is a view illustrating a process of selecting a work sequence of the letters ABC drawn in FIG. 14 by using a stroke unit (i.e., a line unit) selection line.

That is, in FIG. 15, the stroke unit selection line may set a first priority for replay by firstly touching a vertical line of a letter 'B', set a second priority of replay by touching the remaining lines of the letter 'B' in a second order, set a third priority of replay by touching a letter 'C' in a third order, set a fourth priority of replay by touching a lambda-shaped 'Λ' of a letter 'A', and finally set a fifth priority of replay by finally touching a horizontal line of the letter 'A'. each letter of the vector image may be sequentially replayed according to the replay sequence that is set in the way as described above.

Figure 16A:
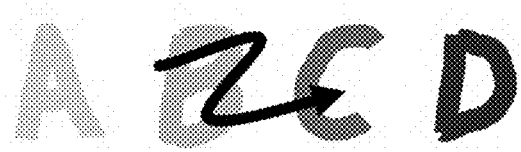
FIGS. 16A and 16B are the views illustrating the method for replaying the unselected lines not selected by the user.
Figure 16B:
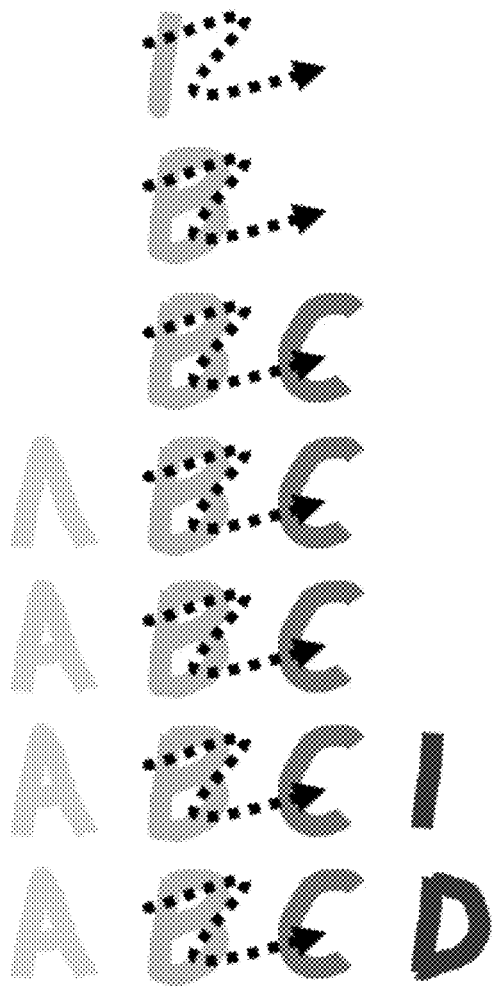

FIGS. 16A and 16B are views illustrating the method for replaying unselected lines not selected by the user.

As shown in FIGS. 16A and 16B, methods including a method of not replaying vector lines not selected by a user, a method for replaying selected lines first and then replaying the unselected vector lines next, or a method for replaying the unselected lines first and then replaying the selected lines later may be easily set as an option.

Figure 17A:
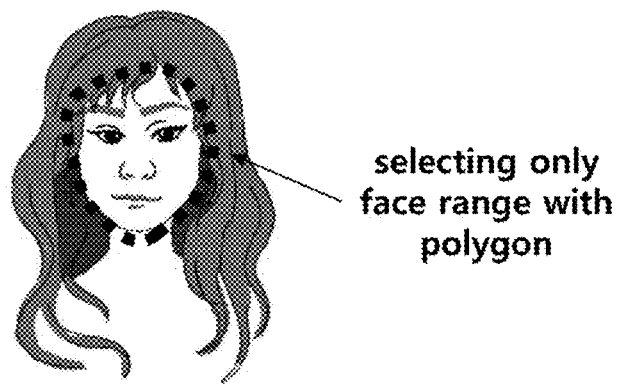
FIGS. 17A and 17B are views illustrating a process of selecting and replaying a region in a vector image.
Figure 17B:
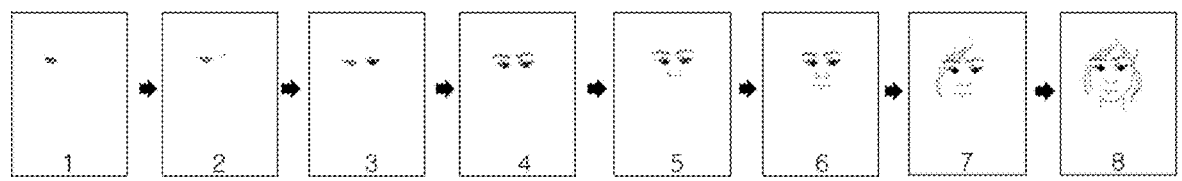

FIGS. 17A and 17B are views illustrating a process of selecting and replaying a region in a vector image.

FIG. 17A is a view illustrating a process in which a user selects vector lines to be replayed by drawing a polygon, and FIG. 17B is a view illustrating a process of replaying only the selected vector lines.

As described above, the embodiment of the present disclosure may replay only the vector lines within the polygon by drawing the polygon in a conventional vector image.

Naturally, the present disclosure is not necessarily limited thereto, and in addition to the polygon, a region may also be selected by a circular or elliptical shape. The setting may also be changed so that only the remaining vector lines except for the selected region may be replayed at a time or sequentially.

According to the present disclosure, after drawing a picture or text in the vector method, in order to emphasize the specific picture or text, a replay sequence may be added, or a color may be changed and the picture or text provided with the color may be replayed, or only the picture and text repeatedly selected in a program may be replayed repeatedly.

Figure 18A:
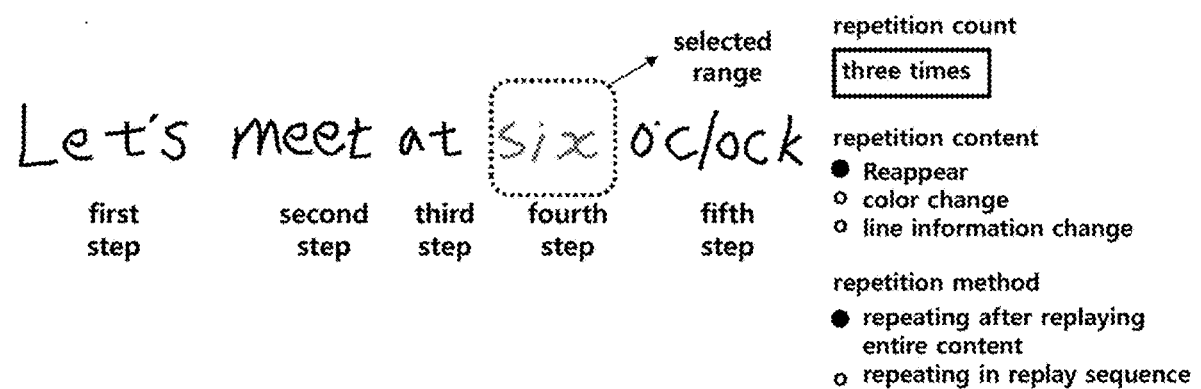

FIGS. 18A, 18B, and 19 are views respectively illustrating processes of selecting, highlighting, and replaying a specific region in an image drawn in the vector method.

FIG. 18A is a view illustrating a process in which a user selects text "six" drawn in the vector method, and sets the number of repetitions, content to be repeated, and a repetition method.

FIG. 18B is a view illustrating a process of repetitive replay according to the information set in FIG. 18A.

In FIGS. 18A and 18B, after drawing a sentence "Let's meet at six o'clock", the time written in the sentence may be emphasized by way of selecting a word "six", setting repetition content as "reappear", and setting the repetition content to be replayed three times.

That is, according to the present disclosure, the user may repeatedly replay only specific selection lines in a process in which a user draws text and communicates emotions with the other party.

FIG. 19 is a view illustrating a process of changing and setting respective colors of the selected vector lines, and emphasizing and repeatedly replaying the set vector lines.

That is, according to the present disclosure, the colors of the highlighted time may be emphasized and repetitively replayed twice.

As described above, in the method for replaying the vector image according to the present disclosure, emotions may be communicated by drawing text in various techniques through section repetition, highlight, and color change.

As described above, the present disclosure that is realized by the present inventors has been described in detail according to the above exemplary embodiment, but the present disclosure is not limited to the above exemplary embodiment, and various modifications can be made without departing from the spirit of the present disclosure.

INDUSTRIAL APPLICABILITY

The present disclosure may be applicable to technology of the method for replaying the vector image in which it is possible to sequentially store every step of drawing work and even a work environment, in addition to vector line information, and replay the stored vector image, as if a scene in which an actual artist was drawing a picture were recorded, while breaking away from the conventional batch replay method of a vector image.

That is, in the related art, only a work process for a conventional picture is able to be viewed by storing work environment information when real artists are working with pictures and text that are drawn in the vector method, but the embodiment of the present disclosure may enable a user to view an actual working environment, and may selectively and repeatedly replay a part of the entire vector image for the user. Accordingly, the present disclosure may be used in schools, academies, and personal hobbies, and communication through repeated replay or highlighting. In addition, since it is also possible to communicate through repeated replay or emphasis with a pictogram, the embodiment of the present disclosure may be usable as a new editable and pictogram with repeatable replay, instead of using text on a mobile device.

The invention claimed is:

1. A method for replaying vector image data to display an image including one or more pictures and/or one more texts on a screen, the vector image data being configured to store information on consecutive work sequences and vector lines that are stored for each work step of drawing the vector lines, the method comprising:
(a) extracting work environment information and replay information of the vector lines included in the original vector image data;
(b) receiving a selection of one or more specific vector lines from among the vector lines included in the original vector image data;
(c) setting group replay information of the one or more specific vector lines selected in step (b);
(d) replaying the original vector image data based on the group replay information; and
(e) storing the group replay information of the one or more specific vector lines,
wherein the group replay information of the one or more specific vector lines in step (c) comprises:
a replay sequence in the one or more specific vector lines;
a starting vector line to start replay;
an end vector line to end replay;
a repetitive replay count; and
highlight pointer information.

2. The method of claim 1, wherein the highlight pointer 2 information comprises at least one of a color, a thickness, and a line type of the one or more specific vector lines, and whether to perform a redrawing-after-erasing function, in a repetitive replay.

3. The method of claim 1, wherein, in step (b), when the vector lines are not selected by a user, all vector lines are selected.

4. A method for replaying vector image data to display an image including one or more pictures and/or one more texts on a screen, the vector image data being configured to store information on consecutive work sequences and vector lines that are stored for each work step of drawing the vector lines, the method comprising:
(a) extracting work environment information and replay information of the vector lines included in the original vector image data;

(b) receiving a selection of one or more specific vector lines from among the vector lines included in the original vector image data;
(c) setting group replay information of the one or more specific vector lines selected in step (b);
(d) replaying the original vector image data based on the group replay information; and
(e) storing the group replay information of the one or more specific vector lines, wherein, in step (b), the one or more specific vector lines are selected by setting one or more of specific colors or specific color ranges.

5. The method of claim 1, wherein, in step (b), the one or more specific vector lines are selected by drawing one or more of polygonal, circular, or elliptical shapes.

6. The method of claim 1, wherein, in step (b), a user draws a selection line such that the one or more specific vector lines are selected by the selection line touching the one or more specific vector lines.

7. The method of claim 1, wherein, in step (d), only the one or more specific vector lines are replayed.

8. The method of claim 1, wherein, in step (d), only the one or more specific vector lines are replayed and then unselected vector lines are replayed, or the unselected vector lines are replayed first and the one or more specific vector lines are replayed later.

9. The method of claim 1, wherein the work environment information of the vector lines comprises at least one of:
   information on positions and sizes of one or more setting windows used in each work step;
   information on screen enlargement sizes and screen positions in each work step; and
   information on positions and sequences of work layers in each work step.

10. The method of claim 9, wherein, in step (d), the original vector image data is replayed according to the work environment information such that screen images that are identical to an actual work screen are displayed for each step.

11. The method of claim 4, wherein, in step (c), different replay sequences are respectively set for the one or more specific vector lines selected by the user.

12. The method of claim 5, wherein, in step (c), different replay sequences are respectively set for the one or more specific vector lines selected by the user.

13. The method of claim 6, wherein, in step (c), different replay sequences are respectively set for the one or more specific vector lines selected by the user.

* * * * *